(12) United States Patent
Moore

(10) Patent No.: US 10,495,167 B2
(45) Date of Patent: Dec. 3, 2019

(54) HEAT DISSIPATING DEVICE FOR BRAKING SYSTEM

(71) Applicant: THE LEGION ENGINEERING CORPORATION, Changhua (TW)

(72) Inventor: Wayne-Ian Moore, Changhua (TW)

(73) Assignee: The Legion Engineering Corporation, Changhua County (TW)

( * ) Notice: Subject to any disclaimer, the term of this patent is extended or adjusted under 35 U.S.C. 154(b) by 136 days.

(21) Appl. No.: 15/678,303

(22) Filed: Aug. 16, 2017

(65) Prior Publication Data
US 2019/0056007 A1  Feb. 21, 2019

(51) Int. Cl.
| | | |
|---|---|---|
| *F16D 65/853* | (2006.01) | |
| *F28D 15/02* | (2006.01) | |
| *F16D 65/092* | (2006.01) | |
| *B62L 1/00* | (2006.01) | |
| *F16D 65/78* | (2006.01) | |

(52) U.S. Cl.
CPC ............ *F16D 65/853* (2013.01); *B62L 1/005* (2013.01); *F16D 65/092* (2013.01); *F28D 15/0283* (2013.01); *F16D 2065/784* (2013.01); *F16D 2065/788* (2013.01)

(58) Field of Classification Search
CPC ...... F16D 65/853; F16D 65/092; F16D 65/84; F16D 2065/788; F28D 15/0283; F28D 1/0226; F28D 2275/122
See application file for complete search history.

(56) References Cited

U.S. PATENT DOCUMENTS

| | | | | |
|---|---|---|---|---|
| 2,940,556 A * | 6/1960 | Jensen | .................. | F16D 65/853 188/251 R |
| 3,767,015 A * | 10/1973 | Odier | ...................... | F16D 65/84 188/264 D |
| 3,850,267 A * | 11/1974 | Odier | .................... | F16D 65/092 188/167 |
| 4,130,187 A * | 12/1978 | Midolo | ................. | F16D 65/853 188/264 CC |
| 4,508,200 A * | 4/1985 | Cigognini | ........... | F16D 55/2245 188/264 P |
| 4,872,487 A * | 10/1989 | Riesen | ................... | D03D 49/54 139/185 |
| 4,944,344 A * | 7/1990 | Crowe | ................ | F28D 15/0233 165/104.11 |
| 5,076,351 A * | 12/1991 | Munekawa | ......... | F28D 15/0233 165/104.14 |
| 5,186,250 A * | 2/1993 | Ouchi | ................... | F28D 1/0316 165/152 |
| 5,445,242 A * | 8/1995 | Pogorzelski | .......... | F16D 55/228 188/264 CC |

(Continued)

*Primary Examiner* — Devon Russell
(74) *Attorney, Agent, or Firm* — Rosenberg, Klein & Lee

(57) ABSTRACT

A heat dissipating device for bicycle braking systems includes a first board and a second board which is connected to the first board to form a room defined therebetween so that cooling liquid flows within the room. The first board includes a first recess and a second recess defined in an inside thereof which faces the second board. The first recess communicates with the second recess. A flanged portion is formed along four sides of the first board. The second board has a grooved portion formed on each of four sides thereof. The flanged portion is engaged with the grooved portions to connect the first and second boards together.

7 Claims, 9 Drawing Sheets

(56) References Cited

U.S. PATENT DOCUMENTS

| | | | |
|---|---|---|---|
| 6,196,358 B1* | 3/2001 | Nakamura | B60T 5/00 188/24.11 |
| 6,321,879 B2* | 11/2001 | Nakamura | B60T 5/00 188/24.11 |
| 7,905,335 B2* | 3/2011 | Demers | F16D 65/0971 188/258 |
| 8,464,848 B2* | 6/2013 | Wen | F16D 65/847 188/250 B |
| 8,646,281 B2* | 2/2014 | Lim | F28D 15/0233 62/235.1 |
| 2006/0131117 A1* | 6/2006 | Pabst | F16D 65/853 188/264 R |
| 2006/0213647 A1* | 9/2006 | Lin | B23P 15/26 165/104.26 |
| 2007/0034462 A1* | 2/2007 | Themelin | F16D 65/092 188/264 R |
| 2009/0178784 A1* | 7/2009 | Wang | B23P 15/26 165/104.26 |
| 2010/0101899 A1* | 4/2010 | Finkel | F16D 65/847 188/71.6 |
| 2011/0024085 A1* | 2/2011 | Huang | F28D 15/0233 165/104.26 |
| 2013/0015023 A1* | 1/2013 | Hassett | F16D 65/847 188/71.6 |
| 2016/0290739 A1* | 10/2016 | Mochizuki | F28F 21/083 |
| 2017/0176108 A1* | 6/2017 | Palanchon | H01M 10/625 |

\* cited by examiner

HEAT DISSIPATING DEVICE FOR BRAKING SYSTEM

BACKGROUND OF THE INVENTION

1. Fields of the Invention

The present invention relates to a heat dissipating device, and more particularly, to a heat dissipating device for bicycle braking systems.

2. Descriptions of Related Art

The bicycle braking systems comprise a brake disk and two clamps which are located on two sides of the brake disk, when the rider operates the braking levers, the clamps move toward the brake disk and clamp the brake disk to stop the wheel. It is noted that the brake disk and the clamps are made by metal, and the friction between the brake disk and the two clamps generates heat which may deform the brake disk to cause mal-function of braking. Some braking systems are equipped with heat dissipating device which is made by cast iron, and includes multiple paths formed therein. Cooling liquid flows through the paths to bring the heat away from the brake disk. However, it is difficult to manufacture the heat dissipating device because surplus material is formed in the paths, and/or the shapes of the paths are not properly formed.

The present invention intends to provide a heat dissipating device for bicycle braking systems which eliminates the shortcomings mentioned above.

SUMMARY OF THE INVENTION

The present invention relates to a heat dissipating device for bicycle braking systems, and comprises a first board and a second board which is connected to the first board to form a room defined therebetween. The first board has a first recess and a second recess defined in the inside thereof which faces the second board. The first recess communicates with the second recess. A flanged portion is formed along four sides of the first board, and the second board has a grooved portion formed on each of four sides thereof. The flanged portion is engaged with the grooved portions to connect the first and second boards together.

Preferably, the flanged portion comprises a first flange, a second flange, a third flange and a fourth flange respectively formed on the four sides of the first board. The first, second, third and fourth flanges are respectively engaged with the grooved portions formed on the four sides of the second board.

Preferably, each of the first, second and third flanges includes a protrusion extending from each of two ends thereof. Each protrusion is engaged with the grooved portion corresponding thereto.

Preferably, each of the first, second, third and fourth flanges includes two opposite faces and an end face which is connected between the two opposite faces. The grooved portions each have two inside faces and an inner end face which is connected between the two inside faces so as to form a groove therebetween. Each of the first, second, third and fourth flanges is engaged with the groove corresponding thereto. The two opposite faces are matched with the two inside faces, and a gap is formed between end face and the inner end face.

Preferably, the first board includes a first liquid hole, a second liquid hole and a cooling tank. The first and second liquid holes are respectively defined through two ends of the cooling tank.

Preferably, a seal member seals the first liquid hole, and the seal member has a head and an urging portion which extending from one side of the head. The head contacts the outside of the end of the cooling tank, and the urging portion extends into the first liquid hole and contacts the inside of the cooling tank.

Preferably, a seal unit seals the second liquid hole of the first board. The seal unit has a washer with a first hole, an O-ring, a seat with a second hole, and an end piece. The washer is attached to the inside of the cooling tank and located close to the second liquid hole. The seat is mounted to the O-ring and attached to an outside of the cooling tank.

Preferably, the first and second boards are made of different metallic material.

Preferably, the second board includes a third recess defined therein an inside thereof. The room is defined by the first, second and third recesses when the first and second boards are connected to each other.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
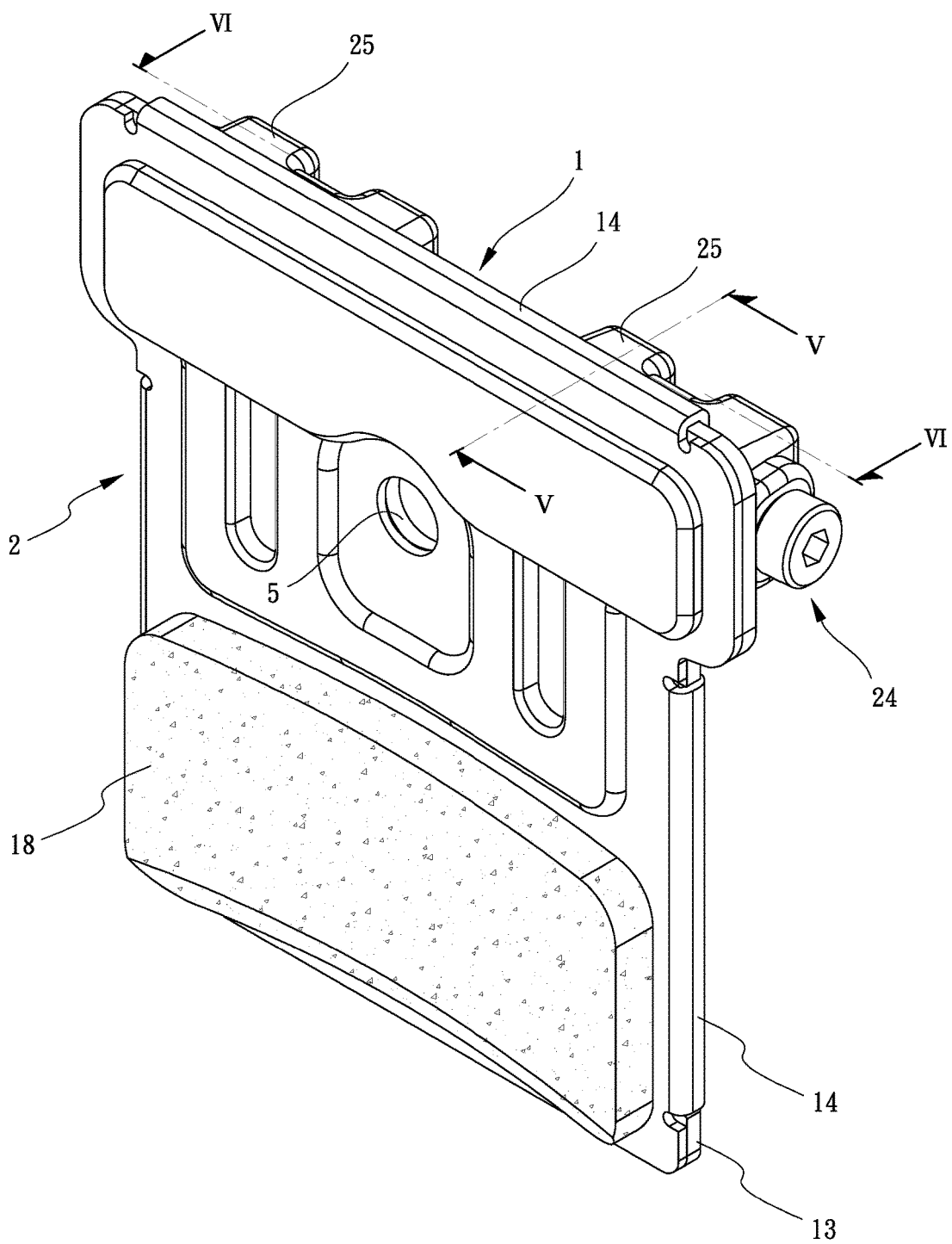
FIG. 1 is a perspective view to show the heat dissipating device of the present invention, wherein the cooling liquid is not yet introduced into the device.
Figure 2:
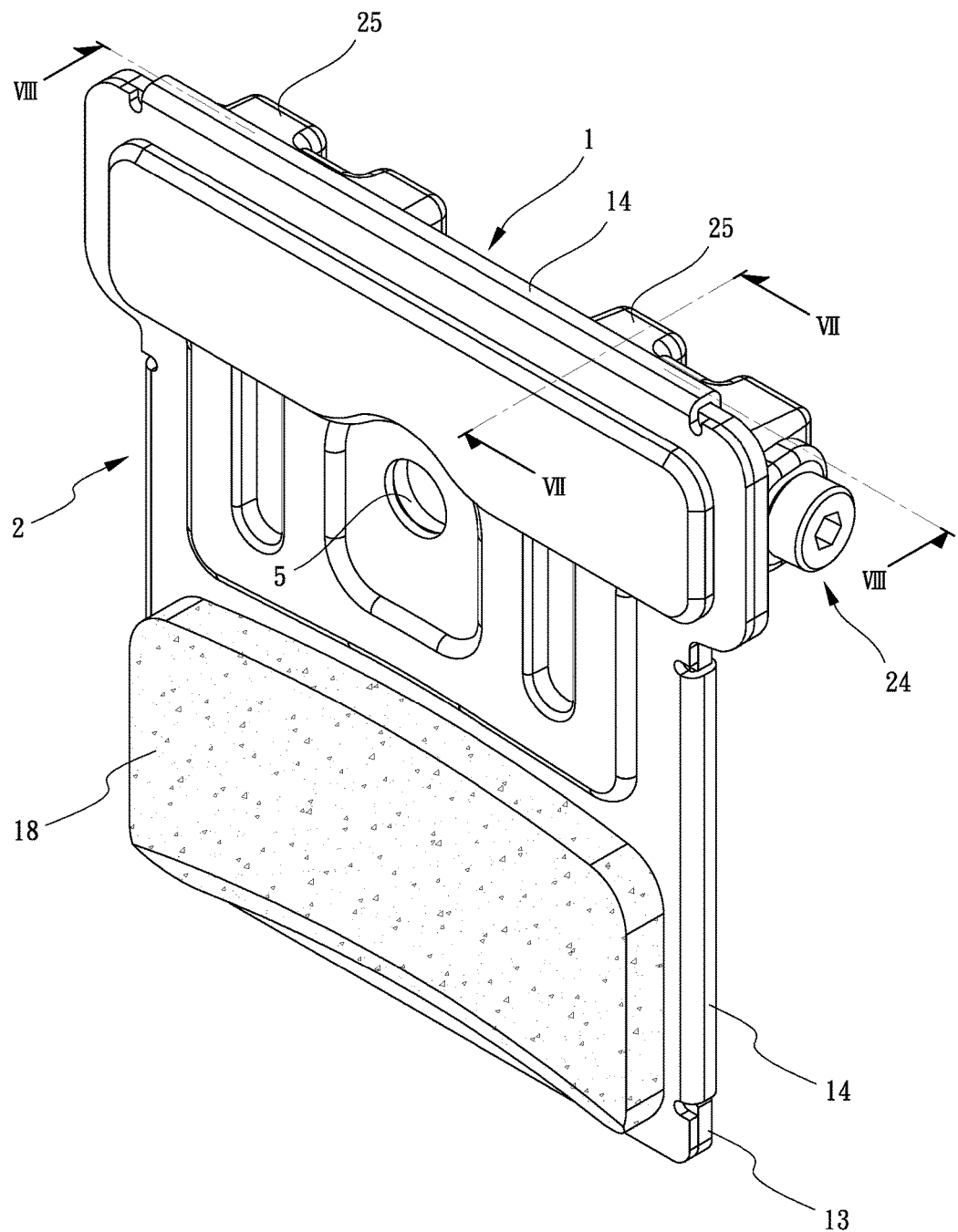
FIG. 2 is a perspective view to show the heat dissipating device of the present invention, wherein the cooling liquid is introduced into the device.

Referring to FIGS. 1 to 7, the heat dissipating device for bicycle braking systems of the present invention comprises a first board 1 and a second board 2 which is connected to the first board 2 to form a room 15 defined therebetween. The first board 1 has a first recess 11 and a second recess 12 defined in the inside thereof which faces the second board 2. The first recess 11 communicates with the second recess 12. The second board 2 includes a third recess 16 defined therein an inside thereof. The room 15 is defined by the first, second and third recesses 11, 12 and 16 when the first and second boards 1, 2 are connected to each other. A flanged portion 13 is formed along four sides of the first board 1, and the second board 2 has a grooved portion 14 formed on each of four sides thereof. The flanged portion 13 is engaged with the grooved portions 14 to connect the first and second boards 1, 2 together.

As shown in FIGS. 1 to 4, the first board 1 and the second board 2 each are a rectangular board, and the four sides of the first and second boards 1, 2 are substantially in flush with each other. The first and second boards 1, 2 may be made of the same or different metallic material. For instance, the first board 1 is made of aluminum, and the second board 2 is made of steel, wherein the aluminum has better heat dissipation feature, and the steel is stiff and is not easily deformed.

The third recess 16 of the second board 2 faces the first and second recesses 11, 12 of the first board 1 so that the cooling liquid contacts a larger area with the first and second boards 1, 2 to have better heat dissipation feature. The second board 2 has multiple bores 17 and a lining pad 18 is attached to the outside of the second board 2. The third recess 16 is located at an upper portion of the second board 2, and the bores 17 and the lining pad 18 are located on a lower portion of the second board 2. The depth of the first recess 11 is deeper than that of the second recess 12. The cooling liquid enters into the room 15 from the first recess 11 and flows between the first and second recesses 11, 12.

The flanged portion 13 comprises a first flange 131, a second flange 132, a third flange 133 and a fourth flange 134 respectively formed on the four sides of the first board 1. The first, second, third and fourth flanges 131, 132, 133, 134 are respectively engaged with the grooved portions 14 formed on the four sides of the second board 2. Each of the first, second and third flanges 131, 132, 133 includes a protrusion 135 extending from each of two ends thereof. Each protrusion 135 is engaged with the grooved portion 14 corresponding thereto.

Figure 4:
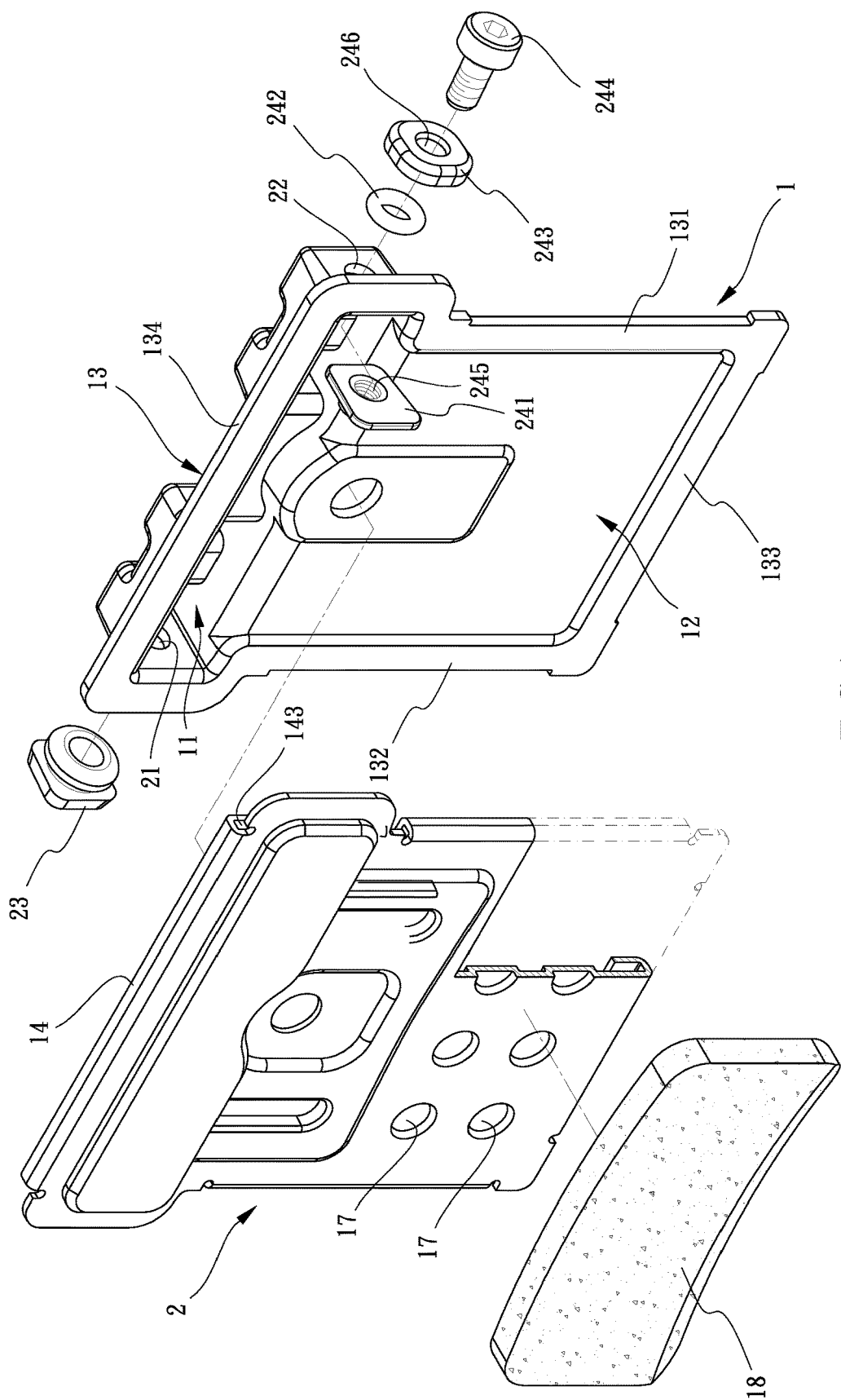
FIG. 4 is another exploded view of the heat dissipating device of the present invention.
Figure 5:
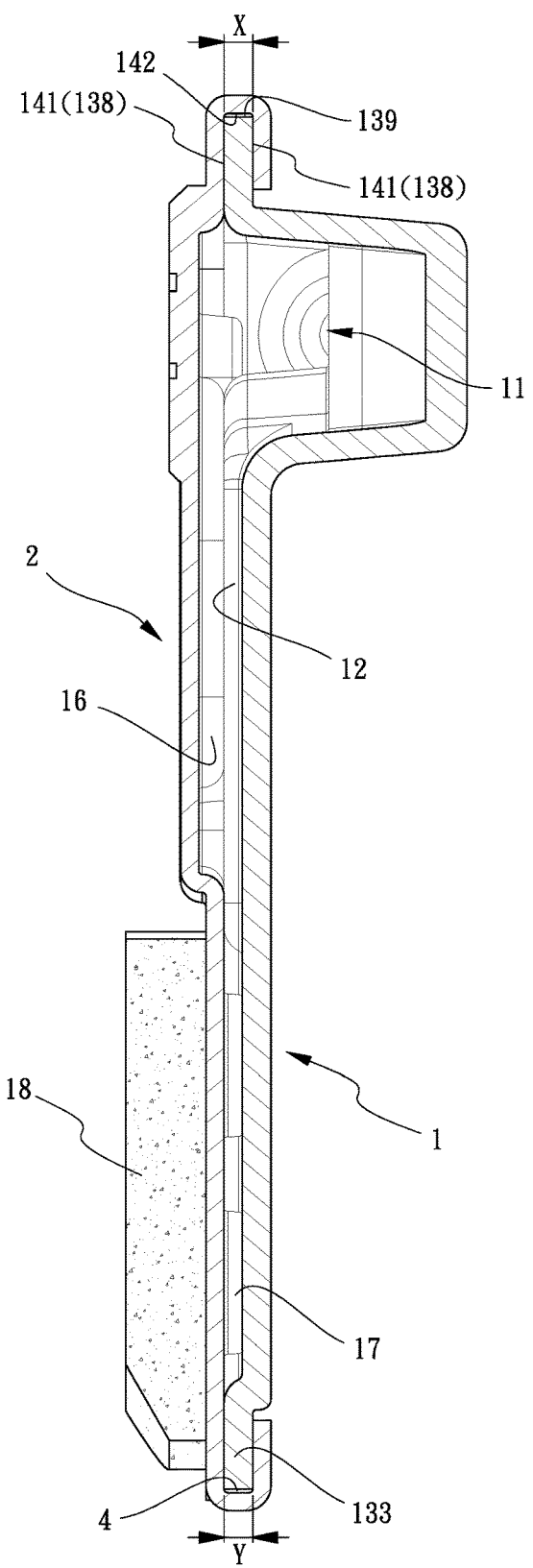
FIG. 5 is a cross sectional view, taken along line IV-IV of FIG. 1.

Specifically, as shown in FIGS. 4 and 5, each of the first, second, third and fourth flanges 131, 132, 133, 134 includes two opposite faces 138 and an end face 139 which is connected between the two opposite faces 138. Each protrusion 135 further includes a first face 136 and a second face 137, wherein the second face 137 is substantially perpendicularly connected with the end face 139. The first face 136 is an outer end face of each protrusion 135 and is substantially perpendicular to the second face 137. A distance between the two opposite faces 138 is the thickness "X" of each of the first, second, third and fourth flanges 131, 132, 133, 134. The grooved portions 14 each have two inside faces 141 and an inner end face 142 which is connected between the two inside faces 141 so as to form a groove 143 therebetween. The groove 143 includes a width "Y" which is smaller or equal to the thickness of "X" to allow the flanged portion 13 to be engaged with the grooved portion 14. Each of the first, second, third and fourth flanges 131, 132, 133, 134 is engaged with the groove 143 corresponding thereto. The two opposite faces 138 are matched with the two inside faces 141, and a gap 4 is formed between end face 139 and the inner end face 142. The gap 4 allows the inflation due to high temperature of the flanged portion 13, such that the flanged portion 13 does not squeeze and deform the grooved portion 14.

As shown in FIGS. 3, 4, 6 and 7, the first board 1 includes a first liquid hole 21, a second liquid hole 22 and a cooling tank 25. The first and second liquid holes 21, 22 are respectively defined through two ends of the cooling tank 25 which protrudes from the outside of the first board 1 along the fourth flange 134. The cooling tank 25 communicates with the first recess 11 which communicates with the first and second liquid holes 21, 22. The cooling liquid can be introduced or drained from the first or second liquid holes 21, 22.

Figure 3:
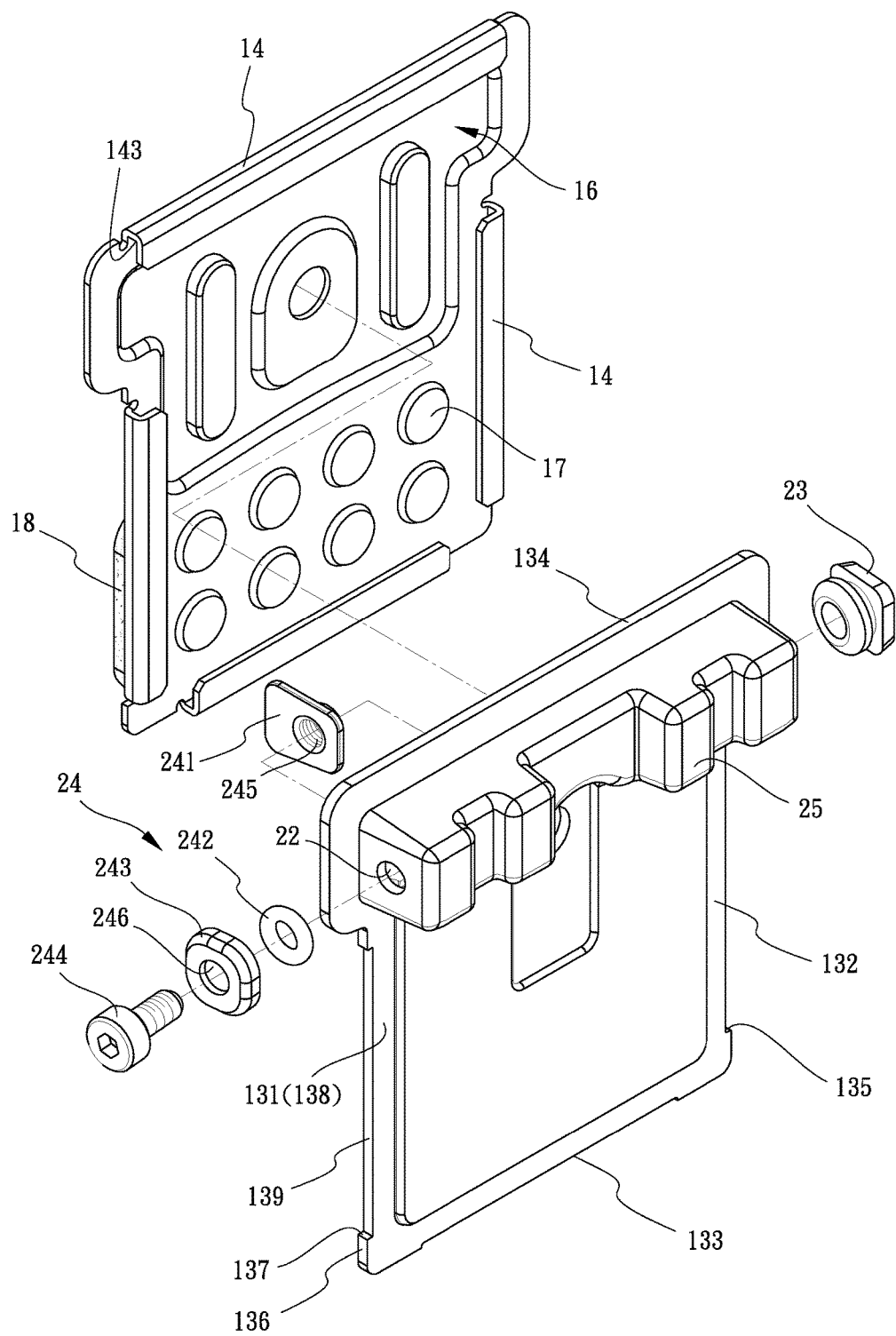
FIG. 3 is an exploded view of the heat dissipating device of the present invention.
Figure 6:
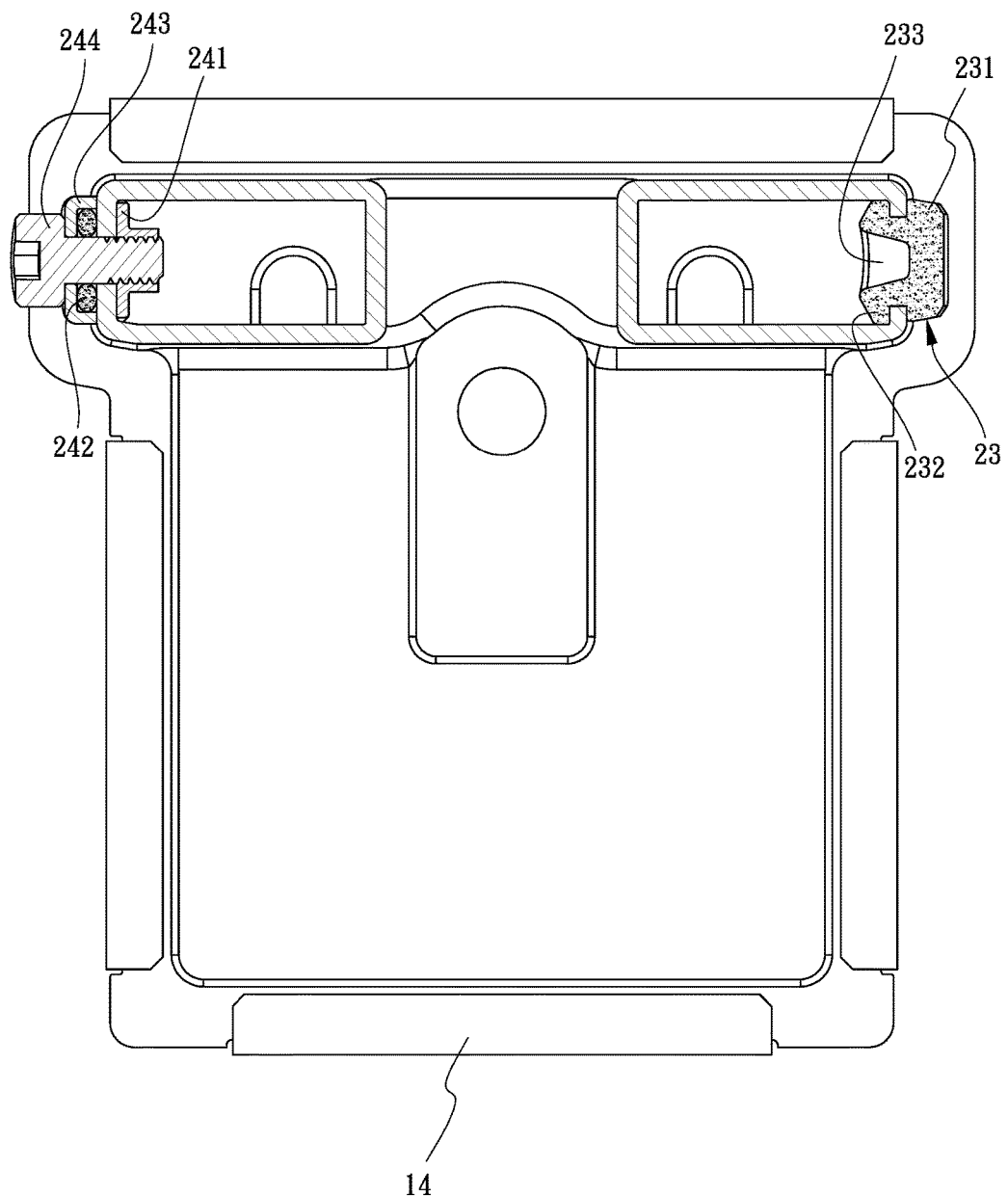
FIG. 6 is a cross sectional view, taken along line V-V of FIG. 1.

As shown in FIGS. 3, 4 and 6, a flexible seal member 23 seals the first liquid hole 21, and the seal member 23 has a head 231 and an urging portion 232 which extending from one side of the head 231. The head 21 contacts the outside of the end of the cooling tank 25, and the urging portion 232 extends into the first liquid hole 21 and contacts the inside of the cooling tank 25. A seal unit 24 seals the second liquid hole 22 of the first board 1. The seal unit 24 has a washer 241 with a first hole 245, an O-ring 242, a seat 243 with a second hole 246, and an end piece 244. The washer 241 is attached to the inside of the cooling tank 25 and located close to the second liquid hole 22. The seat 243 is mounted to the O-ring 242 and attached to an outside of the cooling tank 25.

Figure 7:
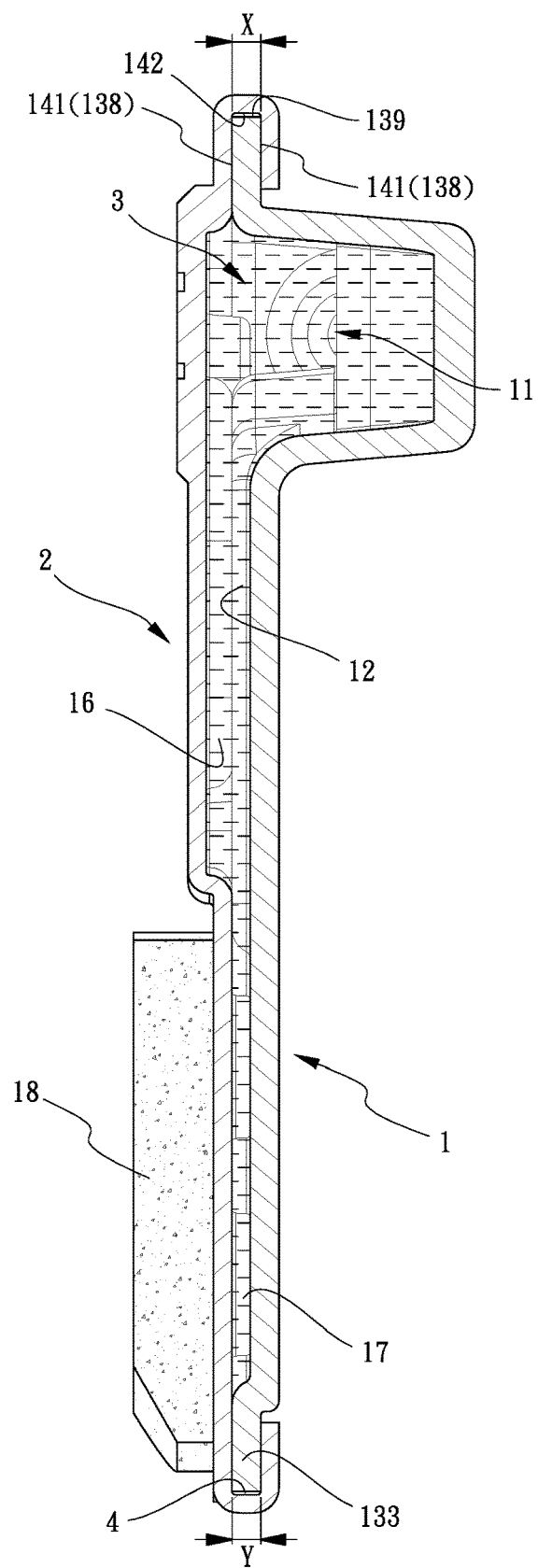
FIG. 7 is a cross sectional view, taken along line VI-VI of FIG. 2.
Figure 8:
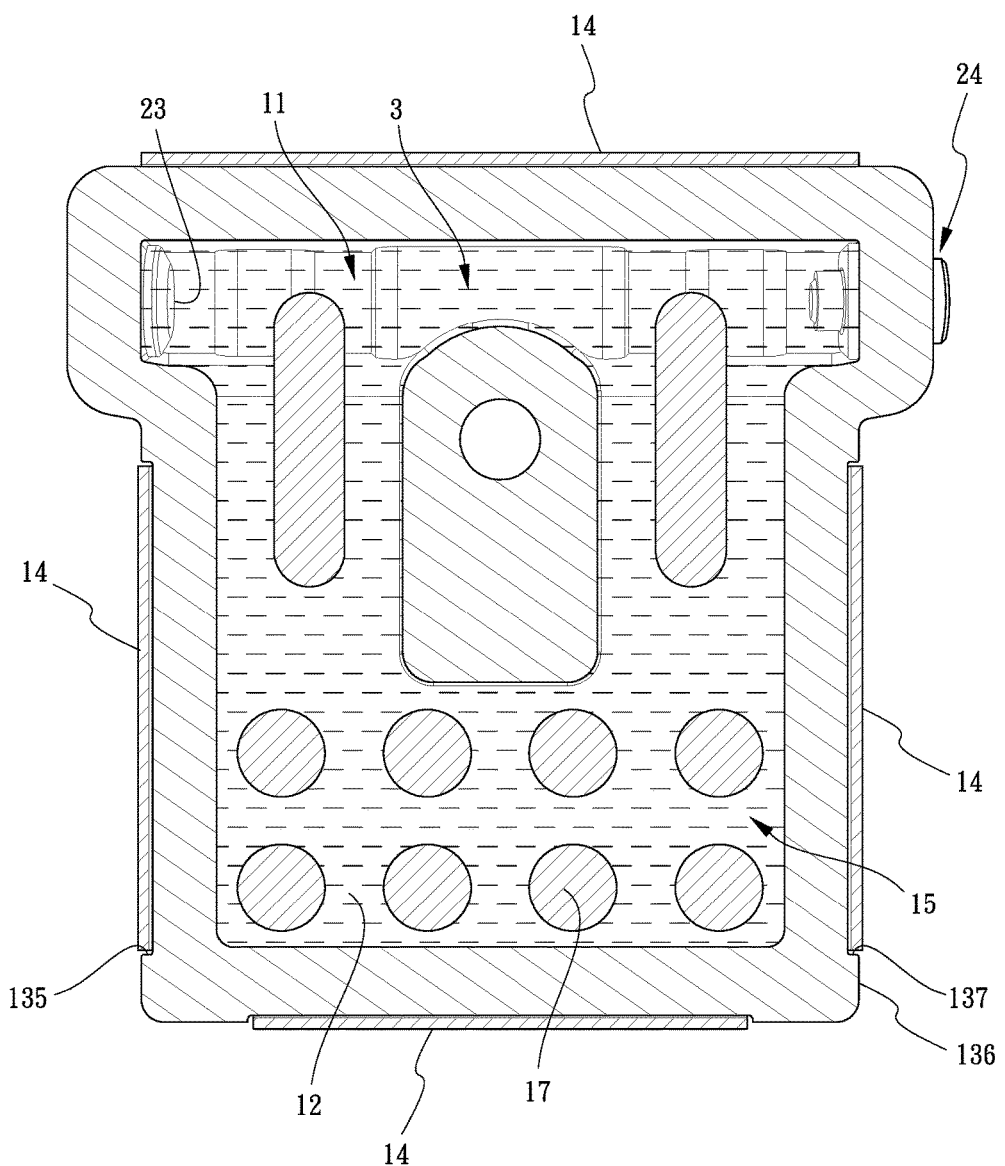
FIG. 8 is a cross sectional view, taken along line VII-VII of FIG. 2.
Figure 9:
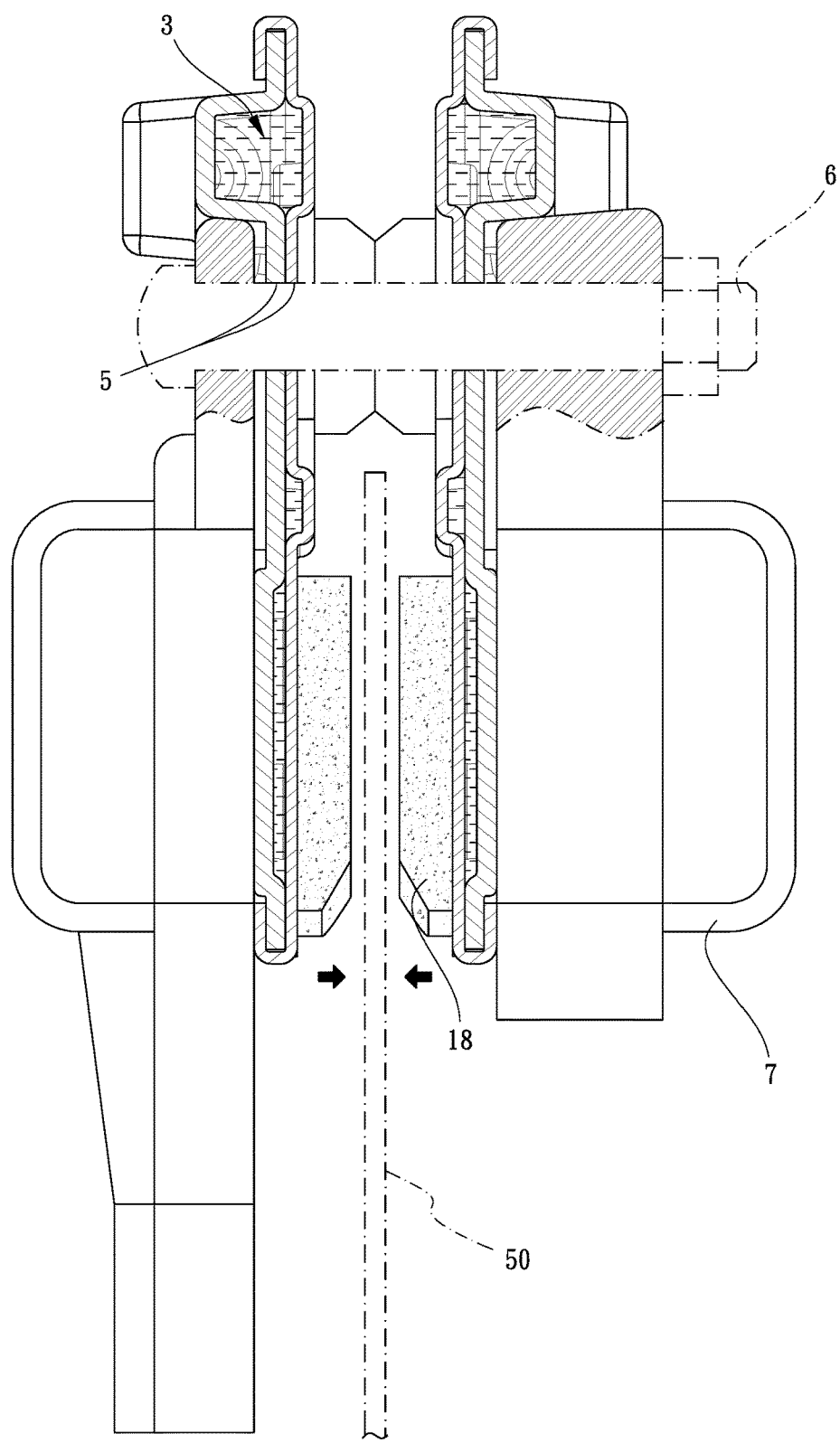
FIG. 9 shows that the heat dissipating device of the present invention is used to a bicycle braking system.

As shown in FIGS. 7 to 9, the two devices of the present invention are connected to each other, and the brake disk 50 is located between the two devices. Each device includes an axle hole 5 and a locking bolt 6 extends through the two respective axle holes 5 to connect the two devices together. The two devices are connected to a clamp unit 7.

When operating the braking action, the two lining pads 18 are moved to clamp the braking disk 50, and friction between the lining pads 18 and the braking disk 50 generates heat which is transferred to the cooling liquid 3 in the second recess 12. The density of the cooling liquid 3 in the second recess 12 is reduced because the cooling liquid 3 inflates due to the heat, so that the cooling liquid 3 in the second recess 12 continuously flows to the first and third recesses 11, 16 where the cooling liquid 3 in the first and third recesses 11, 16 is cooler. The cooling liquid 3 circulates because of the difference of temperature and density. The space between the first and third recesses 11, 16 is large enough to accommodate more cooling liquid 3. The second board 2 is made of metallic material and heat is transferred to the cooling liquid 3. The multiple bores 17 increase contact area between the cooling liquid and the second board 2. The first and third recesses 11, 16 are exposed in ambient temperature so that the heat is escaped from the position of the first and second boards 1, 2 that are located corresponding to the first and third recesses 11, 16. The circulation of the cooling liquid 3 between the first, second and third recesses 11, 12, 13 makes the cooling liquid in the second recess 12 eventually drop to the ambient temperature. That is to say, the baking lining pads 18 are cooled down.

While we have shown and described the embodiment in accordance with the present invention, it should be clear to those skilled in the art that further embodiments may be made without departing from the scope of the present invention.

What is claimed is:

1. A heat dissipating device for bicycle braking systems, comprising:

a first board (1) and a second board (2) which is connected to the first board (1) to form a room (15) defined therebetween, the first board (1) having a first recess (11) and a second recess (12) defined in an inside thereof which faces the second board (2), the first recess (11) communicating with the second recess (12), a flanged portion (13) formed along four sides of the first board (1), first board (1) including a first liquid hole (21), a second liquid hole (22) and a cooling tank (25), the first and second liquid holes (21, 22) respectively defined through two ends of the cooling tank (25), a seal member (23) sealing the first liquid hole (21), a seal unit (24) sealing the second liquid hole (22), the seal member (23) having a head (231) and an urging portion (232) which extends from one side of the head (231), the head (21) contacting an outside of the end of the cooling tank (25), and the urging portion (232) extending into the first liquid hole (21) and contacting an inside of the cooling tank (25), the second board (2) having a grooved portion (14) formed on each of four sides thereof, the flanged portion (13) being engaged with the grooved portions (14) to connect the first and second boards (1, 2) together, and a lining pad (18) of a bicycle braking system attached to an outside of the second board (2).

2. The heat dissipating device as claimed in claim 1, wherein the flanged portion (13) comprises a first flange (131), a second flange (132), a third flange (133) and a fourth flange (134) respectively formed on the four sides of the first board (1), the first, second, third and fourth flanges (131, 132, 133, 134) are respectively engaged with the grooved portions (14) formed on the four sides of the second board (2).

3. The heat dissipating device as claimed in claim 2, wherein each of the first, second and third flanges (131, 132, 133) includes a protrusion (135) extending from each of two ends thereof, each protrusion (135) is engaged with the grooved portion (14) corresponding thereto.

4. The heat dissipating device as claimed in claim 3, wherein each of the first, second, third and fourth flanges (131, 132, 133, 134) includes two opposite faces (138) and an end face (139) which is connected between the two opposite faces (138), the grooved portions (14) each have two inside faces (141) and an inner end face (142) which is connected between the two inside faces (141) so as to form a groove (143) therebetween, each of the first, second, third and fourth flanges (131, 132, 133, 134) is engaged with the groove (143) corresponding thereto, the two opposite faces (138) are matched with the two inside faces (141), and a gap (4) is formed between end face (139) and the inner end face (142).

5. The heat dissipating device as claimed in claim 1, wherein the seal unit (24) has a washer (241) with a first hole (245), an O-ring (242), a seat (243) with a second hole (246), and an end piece (244), the washer (241) is attached to an inside of the cooling tank (25) and located close to the second liquid hole (22), the seat (243) is mounted to the O-ring (242) and attached to an outside of the cooling tank (25).

6. The heat dissipating device as claimed in claim 5, wherein the first and second boards (1, 2) are made of different metallic material.

7. The heat dissipating device as claimed in claim 1, wherein the second board (2) includes a third recess (16) defined therein on an inside thereof, the room (15) is defined by the first, second and third recesses (11, 12, 16) when the first and second boards (1, 2) are connected to each other.

* * * * *